United States Patent [19]

McCaul

[11] Patent Number: 5,385,982
[45] Date of Patent: Jan. 31, 1995

[54] MATERIAL FOR REFRIGERATOR LINERS

[75] Inventor: Joseph P. McCaul, Mentor, Ohio

[73] Assignee: The Standard Oil Company, Cleveland, Ohio

[21] Appl. No.: 184,403

[22] Filed: Jan. 21, 1994

Related U.S. Application Data

[63] Continuation of Ser. No. 670,099, Mar. 15, 1991, abandoned.

[51] Int. Cl.⁶ .................. C08F 265/08; C08F 279/02; B32B 1/00
[52] U.S. Cl. ..................... 525/310; 525/202; 525/284; 525/285; 525/289; 525/296; 525/302; 525/312; 428/36.8
[58] Field of Search ............... 525/310, 282, 284, 285, 525/289, 296, 302, 312; 428/36.8

[56] References Cited

U.S. PATENT DOCUMENTS

| | | | |
|---|---|---|---|
| 3,426,102 | 2/1969 | Solak et al. | 525/310 |
| 4,005,919 | 2/1977 | Hoge et al. | |
| 4,503,187 | 3/1985 | Gunesin et al. | 525/86 |
| 4,775,523 | 10/1988 | Sparacio et al. | |
| 5,224,623 | 7/1993 | LaFleur | |

*Primary Examiner*—Vasu S. Jagannathan
*Attorney, Agent, or Firm*—David P. Yusko; Michael F. Esposito; David J. Untener

[57] ABSTRACT

Refrigerator and freezer liners are molded from rubber modified graft copolymers of acrylonitrile and methyl acrylate. These polymers comprise 14 to 30 percent by weight of a butadiene-acrylonitrile elastomer rubber. Further these polymers show excellent impact strength at low temperatures and are resistant to solvents used as blowing agents for refrigerator and freezer insulation.

10 Claims, No Drawings

MATERIAL FOR REFRIGERATOR LINERS

This application is a continuation of Ser. No. 07/670,099, filed Mar. 15, 1991, now abandoned.

BACKGROUND OF THE INVENTION

1. Field of the Invention

The present invention relates to the use of rubber modified graft copolymers of acrylonitrile and methyl acrylate used as refrigerator liners. Such polymers comprising about 14 to 30 weight percent of a rubbery polymer and have excellent low temperature impact properties.

2. Description of the Prior Art

As used herein "refrigerator" shall mean any cabinet, room, chest, box or other container used to keep food or other items cool or frozen. Therefore, as used herein "refrigerator" includes within its scope, refrigerators, freezers and other similar appliances.

Currently refrigerator interiors (also referred to herein as liners or boxes and including within its scope racks, shelves, bins or other containers) are typically molded from acrylonitrile-butadiene-styrene resins (ABS) or high impact polystyrene (HIPS). ABS resins are generally superior in properties to HIPS resins for refrigerator liners but are somewhat more expensive. The liners are encased by a metal outer shell and between the liner and outer shell, insulation is added to decrease the heat transfer into the refrigerator box.

In the past, the insulation was blown into the cavity between the inner box and outer shell using chlorofluorocarbon (CFC) blowing agents. For environmental reasons, such blowing agents are being replaced by hydrochlorofluorocarbon (HCFC) blowing agents. Unfortunately, HCFC blowing agents attack and degrade the current HIPS or ABS liners causing the liners to lose impact strength and become more susceptable to breaking or cracking during normal use.

Rubber modified graft polymers of acrylonitrile and methyl acrylate as described in U.S. Pat. No. 3,426,102 are known for good impact resistance as well as good chemical and solvent resistance. However, commercial grades of such copolymers typically had a lower impact strength than ABS at normal refrigeration temperatures and were not believed to be suitable for such applications.

An object of the instant invention is to develop a refrigerator liner made from a moldable resin having excellent impact properties at low temperatures, which would not be attacked or degraded by the HCFC blowing agents used in conjunction with the insulation materials used in refrigerators.

SUMMARY OF THE INVENTION

It has been discovered that refrigerator liners having excellent low temperature impact strength which can withstand contact with HCFC blowing agents can be made by molding the thermoplastic polymeric composition resulting from the polymerization in aqueous medium of 100 parts by weight based on the combined weight of (A), (B) and (C) of (A) at least 50% by weight based on the combined weight of (A) and (B) of an alpha, beta-olefinically unsaturated mononitrile having the structure

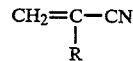

wherein R is a member selected from the group consisting of hydrogen, a lower alkyl group having from 1 to 4 carbon atoms and a halogen and (B) up to 50% by weight based on the combined weight of (A) and (B) of an ester of an olefinically unsaturated carboxylic acid having the structure

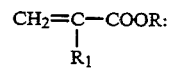

wherein $R_1$ is a member selected from the group consisting of hydrogen, an alkyl group having from 1 to 4 carbon atoms and a halogen and $R_2$ is an alkyl group having from 1 to 2 carbon atoms in the presence of from 14 to 30 parts by weight of (C) a copolymer of a conjugated diene monomer and an olefinically unsaturated nitrile having the structure

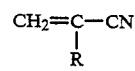

wherein R has the foregoing designation, said copolymer containing from 50 to 95% by weight of polymerized conjugated diene monomer and from 50 to 5% by weight of polymerized olefinically unsaturated nitrile.

DETAILED DESCRIPTION OF THE INVENTION

The Polymer

The polymers suitable for use as refrigerator or freezer liners in the present invention are prepared by polymerizing a major portion of an olefinically unsaturated nitrile, such as acrylonitrile, and a minor portion of an ester of an olefinically unsaturated carboxylic acid, such as methyl acrylate, in the presence of a preformed rubbery copolymer composed of a major proportion of a conjugated diene monomer, such as butadiene, and a minor proportion of olefinically unsaturated nitrile, such as acrylonitrile.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3 and the like and others. Most preferred for the purpose of this invention are butadiene and isoprene because of their ready availability and their excellent copolymerization properties.

The olefinically unsaturated nitriles useful in the present invention are the alpha-beta-olefinically unsaturated mononitriles having the structure

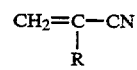

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids useful in the present invention are preferably the lower alkyl esters of alpha, beta-olefinically unsaturated carboxylic acids and more preferred are the esters having the structure

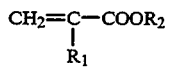

wherein $R_1$ is hydrogen, an alkyl group having from 1 to 4 carbon atoms, or a halogen and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl, alpha-chloro acrylate, ethyl, alpha-chloro acrylate and the like. Most preferred in the present invention are methyl acrylate, ethyl acrylate, and methyl methacrylate.

The polymeric compositions of use in the present invention can be prepared by any of the known general techniques of polymerization including the bulk polymerization, solution polymerization and emulsion of suspension polymerization techniques by batch, continuous or intermittent addition of the monomers and other components. The preferred method is emulsion polymerization. The novel polymeric products are prepared by polymerizing the olefinically unsaturated nitrile and the ester of the olefinically unsaturated carboxylic acid in the presence of a preformed copolymer of the conjugated diene monomer and the olefinically unsaturated nitrile. The polymerization is preferably carried out in aqueous medium in the presence of a free-radical generating polymerization initiator, emulsifiers and chain transfer agents at a temperature of from about 0° to 100° C. in the substantial absence of molecular oxygen.

The initiator, usually required for satisfactory polymerization rate, may be any of those commonly employed for the polymerization of nitrile or acrylate esters including the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate, sodium, potassium and ammonium persulfate and others, such as those disclosed in U.S. Pat. Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulphur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of silver, copper, iron, cobalt, nickel and others. Other suitable initiators include azobisisobutyronitrile and like compounds. The preferred range of initiator as above defined, is from about 0.01 to 5 parts by weight per one-hundred parts by weight of monomers.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; arylalkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinimide, the polyalkyl and polyalkaryl alkoxylene phosphonate acids and salts more fully described in U.S. Pat. No. 2,853,471, the so-called cationic emulsifiers such as the salts of strong inorganic acids and organic bases containing long carbon chains, for instance, lauryl amine hydrochloride, the hydrochloride of diethylaminoethyl decylamine, trimethyl cetyl ammonium bromide, dodecyl trimethyl ammonium bromide, the diethyl cyclohexylamine salt or cetyl sulfonic ester and others may be used.

In addition to the above and other polar or ionic emulsifiers, still other materials which may be used, singly or in combination with one or more of the above types of emulsifiers include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latexes embodied herein for improved stability.

While the polymerization may be carried out in the presence of trace amount of air, the rate of reaction is ordinarily faster in the absence of oxygen and hence, polymerization in an evacuated vessel, at reflux, or under an inert atmosphere such as nitrogen or $CO_2$ is preferred. The temperatures at which the polymerization is carried out is not critical, and the temperature may be varied widely from $-30°$ C. to 100° C. or higher, though best results are generally obtained at a temperature of from about 20° C. to about 70° C. Although the pH of the polymerization system is not critical, it is preferred that a pH of about 6 be employed during the polymerization reaction.

The simultaneous interpolymerization of a mixture of the conjugated diene monomer, the olefinically unsaturated nitrile and the ester of ar olefinically unsaturated carboxylic acid does not produce polymeric products which resemble the polymeric products resulting from the instant process. Moreover, the physical blending of a copolymer of the conjugated diene monomer and the olefinically unsaturated nitrile with a copolymer of the olefinically unsaturated nitrile and an ester of an olefinically unsaturated carboxylic acid does not produce polymeric products which resemble in physical properties the polymeric products required for the instant invention.

Optionally, the graft portion of the polymers described herein may include one or more comonomers polymerizable with the olefinically unsaturated nitriles and the esters of the olefinically unsaturated carboxylic acids. Optional comonomers include alpha-olefins having 4 to 10 carbons, vinyl ethers, vinyl esters, acrylamide monomers, vinyl aromatic monomers, N-vinyl imides, maleic anhydride, indene and coumarone. Representative alpha olefins include isobutylene, 2-methyl butene-1, 2-methyl pentene-1, 2-methyl hexene-1, 2-methyl heptene-1, 2-methyl octene-1, 2-ethyl butene-1, 2,4,4-trimethylpentene-1 (di-isobutylene), 2-propyl pentene-1, and the like. Representative vinyl ethers include methyl vinyl ether, ethyl vinyl ether, the propyl vinyl ethers, the butyl vinyl ethers, methyl isopropenyl ether, ethyl isopropenyl ether, and the like. Representative vinyl esters include vinyl acetate, vinyl propionate, the vinyl butyrates, vinyl benzoate, isopropenyl acetate, and generally vinyl esters having the formula

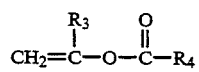

wherein $R_3$ represents hydrogen and a methyl group and $R_2$ represents a hydrocarbon group having from 1 to 8 carbon atoms. Representative acrylamide monomers include acrylamide, methacrylamide, N-t-butyl acrylamide, N-(1,1,3,3-tetramethyl butyl) acrylamide, N-methyl acrylamide, N-phenyl acrylamide, N-methyl methacrylamide, N-t-butyl methacrylamide, N-vinyl benzamide, N-vinyl pyrrolidone, and diacetone acrylamide. Representative vinyl aromatic monomers include styrene, alpha-methyl styrene, monochlorostyrenes, t-butyl styrenes, vinyl toluene, vinyl xylenes, and vinyl naphthalenes. Representative N-vinyl imides include N-vinyl succinimide, N-vinyl glutarimide, and N-vinyl phthalimide.

The preferred polymeric compositions used herein are those resulting from the polymerization of 100 parts by weight of (A) at least 50%, more preferably at least 70%, by weight based on the combined weight of (A) and (B) of at least one nitrile having the structure

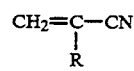

wherein R has the foregoing designation and (B) up to 50%, more preferably up to 30%, by weight based on the combined weight of (A) and (B) of an ester having the structure

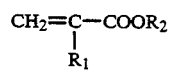

wherein $R_1$ and $R_2$ have the foregoing designation in the presence of (C) from 14 to 30 parts by weight of a copolymer of a conjugated diene monomer selected from the group consisting of butadiene and isoprene and an olefinically unsaturated nitrile having the structure

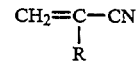

wherein R has the foregoing designation containing from 50 to 95% by weight of polymerized conjugated diene and from 50 to 5% by weight of polymerized olefinically unsaturated nitrile.

More specifically, the present invention can be illustrated in the polymerization of a mixture of acrylonitrile and methyl acrylate in the presence of a preformed copolymer of 1,3-butadiene and acrylonitrile to produce a polymer having excellent impact strength, and exceptionally good impermeability to gases and vapors and excellent chemical and solvent resistance. Preferably, the acrylonitrile-methyl acrylate monomer feed should contain at least 50% by weight of acrylonitrile based on the combined weights of acrylonitrile and methyl acrylate, and more preferably, the acrylonitrile fed to the polymerization reaction should be in the order of from 60 to 90% by weight based on the combined weight of all of the acrylonitrile and methyl acrylate used in the polymerization. Approximately 75% by weight acrylonitrile is most preferable.

The rubbery copolymer of 1,3-butadiene and acrylonitrile preferably contains more than 50% by weight of combined butadiene based on the total weight of combined butadiene and acrylonitrile. More preferably, the rubbery copolymer of butadiene and acrylonitrile should contain from 50 to 90% and most preferably 60 to 80% by weight of polymerized butadiene.

For the polymers used in the instant invention, it is preferred that from about 14 to 30 and preferably 16 to 20 parts of the rubbery copolymer of butadiene and acrylonitrile be employed for each 100 parts of combined acrylonitrile and methyl acrylate and rubbery copolymer. It has generally been found that as the relative amount of the rubbery copolymer of butadiene and acrylonitrile is increased in the final polymeric product, the impact strength increases and the gas and vapor barrier properties decrease.

The rubber modified polymers containing 14 to 30 weight percent of the rubbery polymer as described herein have excellent physical properties. For example, such polymers will typically meet the following values:

| Property | Method | Unit | Values |
|---|---|---|---|
| Tensile Strength | D 638 | psi | 8,000 or less |
| Tensile Modulus | D 638 | psi | 450,000 or less |
| Tensile Elongation, @ Break | D 638 | % | 10 or more |
| Flexural Modulus | D 790 | psi | 450,000 or less |
| Notched Izod Impact | D 256 | ft-lb/in | 5.0 or greater |

Applications

The polymers described herein are thermoplastic materials which can be thermoformed into a wide variety of useful articles in any of the convention ways employed with known thermoplastic polymeric materials such as by extrusion, milling, molding, drawing, blowing, etc. These polymers have excellent solvent resistance and low temperature impact strength and low permeability to gases and vapors.

For these reasons these polymers are suitable materials for use as refrigerator liners as well as shelves or storage bins used therein. Further these polymers have utility for molded articles for use in applications where durability under low temperatures (i.e., less than 10° C. and more particularly less than 0° C.) and solvent resistance is required. For example, body and engine components (fuel filter cannisters, etc.) for automobiles and recreational vehicles (e.g., snowmobiles).

In order to produce the refrigerator liners, typically, the rubber modified polymers described herein are first extruded into flat sheet approximately 1.0 to 4.0 mm thickness (more typical is approximately 3 mm thick) and then thermoformed into the shaped article.

SPECIFIC EMBODIMENTS

In order to better illustrate the instant invention the following examples are provided:

Example 1: Preparation of a Butadiene-Acrylonitrile Elastomer

The graft polymers described herein incorporate a butadieneacrylonitrile preformed elastomer (or rubbery polymer) latex. This rubbery latex can be prepared by polymerizing with continuous agitation at 50° C. in the substantial absence of oxygen a mixture of the following ingredients:

| Ingredient | Parts |
|---|---|
| acrylonitrile | 30 |
| butadiene-1,3 | 70 |
| GAFAC RE-610* (emulsifier) | 2.4 |
| azobisisobutyronitrile | 0.3 |
| t-dodecyl mercaptan | 0.5 |
| water | 200 |

*A mixture of R—O—(CH$_2$CH$_2$O)$_n$—PO$_3$M$_2$ and [R—O—(CH$_2$CH$_2$O)$_n$]$_2$PO$_2$M where n is a number from 1 to 40, R is an alkyl or arylalkyl group and M is hydrogen, ammonia or an alkali metal. This emulsifier is a product of GAF Corporation.

Before the reaction is started, the pH of the mixture is adjusted to about 8 with KOH. The polymerization is carried for approximately 22 hours. Conversions of 92 percent and total solids of 33.1 percent are typical.

Example 2: Preparation of the Rubber Modified Polymer

A rubber modified polymer of acrylonitrile and methacrylate containing approximately 18 weight percent rubber was prepared by the following recipe.

| Ingredient | phm, Parts |
|---|---|
| Distilled Water (total) | 235.0 |
| Acrylonitrile | 75.0 |
| Methacrylate | 25.0 |
| Elastomer of Example 1 (solid content) | 17.5 |
| Sodium Dioctyl Sulfosuccinate (70%) (surfactant) | 1.31 |
| Polyvinylpyrrolidone (4%) (cosurfactant) | 0.50 |
| Pentaerythritol tetramercaptotrionate (Mercaptan chain transfer agent) | 1.8–2.0 |
| Potassium persulfate K$_2$S$_2$O$_8$ (free radical initiator) | 0.06 |

The polymer was prepared in a one liter three-neck glass reactor equipped with mechanical stirrer, water condenser, thermometer and with oil bath for heating the reactor. Since polymerization was exothermic and fast, a careful temperature control was required to prevent the potential of a run-away reaction. Cooling was done by lowering the oil bath and using compressed air to cool down the reactor when a sudden temperature rise was observed. The polymerization was run isothermally at 58° C. and reached 85–90% conversion in 3–3.5 hours. No external heat was required to push the polymerization to 80+% conversion. Final latices showed excellent stability, there was no significant amount of prefloc found in the 1-liter glass reactor.

The reactor was thoroughly purged with nitrogen before the polymerization. Water, surfactant, the polyvinylpyrrolidone solution and elastomer were charged into the reactor first, followed by 95% of the monomers, a viscous liquid, difficult to accurately pump into the reactor with lab-size syringe pump. The chain transfer agent was diluted with 5% of the total monomer to reduce the viscosity for better control of the injection rate.

Catalyst (potassium persulfate) was added into the reactor when the reactor temperature reaches 57° C. After the catalyst addition and over a time span of about 60 minutes, the chain transfer agent was added into the reactor. During the polymerization the conversion of the reaction was monitored by determining the total solid content of the latices. After the polymerization was over, the latices were stabilized with the stabilizer package consisting of trinonyl phenyl phosphite and dilauryldithroproporionate. The polymer was worked up by alum-coagulation, washed, collected and dried in the fluid-bed dryer at 50° C.

The resulting rubber modified acrylonitrile and methyl acrylate copolymer containing 18 weight percent of 70/30 butadiene-acrylonitrile elastomer rubber has the typical physical properties shown in Table 1 below.

TABLE 1

| TYPICAL PHYSICAL PROPERTIES | | | |
|---|---|---|---|
| Property | Method | Units | Values |
| General | | | |
| Bulk Density | D 1895 | g/cm$^3$ | .70 |
| Specific Gravity/Density | D 792 | g/cm$^3$ | 1.11 |
| Yield | | in$^2$-mil/lb. | 24,950 |
| Mechanical | | | |
| Tensile Strength, Yield | D 638 | psi | 7,500 |
| Tensile Elongation, Yield @ 2% Strain Offset | D 638 | % | 4.0 |
| Tensile Elongation @ Break | D 638 | % | 20 |
| Tensile Modulus | D 638 | psi | 390,000 |
| Flexural Strength, Yield @ 5% Strain | D 790 | psi | 13,700 |
| Flexural Modulus | D 790 | psi | 400,000 |
| Notched Izod Impact | D 256 | ft-lb/in | 7.0 |
| Hardness, Rockwell | D 785 | M | 45 |
| Gas Permeability | | | |
| Oxygen Transmission Rate 73° F., 100% RH) | D 3985 | $\dfrac{\text{cc-mil}}{100 \text{ in}^2/24 \text{ hrs/atm}}$ | 1.6 |
| Water Vapor Transmission Rate (100° F., 100% RH) | F 372 | $\dfrac{\text{g-mil}}{100 \text{ in}^2/24 \text{ hrs/atm}}$ | 7.5 |
| Thermal | | | |
| Heat Deflection Temperature, (°F.) | D 648 | @ 66 psi | 160 |
| | D 648 | @ 264 psi | 150 |

Example 3: Comparison of Polymers to ABS Resin

|  | Polymer of Example 2 | Typical ABS Resin |
|---|---|---|
| Flexural Modulus | 400,000 | 333,500 |
| Density | 1.11 | 1.05 |
| $CO_2$ - Barrier* | Orders of Magnitude Better than ABS | — |
| Moisture Barrier | Better than ABS | — |
| Chemical Resistance | Resistant to HCFC's | Dissolved by HCFC's |
| Thermoformability | Excellent | Good |
| Notched Izod Impact (ft-lbs/in) | ~ 7 @ 0° C. ~ 5.5 @ −10° C. | ~ 2.25 @ 0° C. ~ 1.75 @ −10° C. |
| Residual Acrylonitrile Monomer | <10 ppm | 50 to 100 ppm |

*$CO_2$ is used in conjunction with the CFC and HCFC blowing agents for refrigerator insulation. The $CO_2$ entrapped in the insulation enhances the performance of the insulation. Loss of the entrapped $CO_2$ causes a decrease in the efficiency of the insulation.

Although only a few embodiments of this invention have been described herein, it is to be appreciated that many additions and modifications can be made without departing from the spirit and scope of the invention. These and all other modifications are intended to be included within the scope of this invention, which is to be limited only by the following claims.

The claimed invention is:

1. A refrigerator liner comprising a thermoplastic polymeric composition resulting from the polymerization in an aqueous medium of 100 parts by weight of
   (A) at least 50% by weight based on the combined weight of (A) and (B) of an alpha, beta-olefinically unsaturated mononitrile having the structure

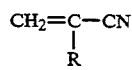

wherein R is a member selected from the group consisting of hydrogen, a lower alkyl group having from 1 to 4 carbon atoms and a halogen and
   (B) up to 50% by weight based on the combined weight of (A) and (B) of an ester of an olefinically unsaturated carboxylic acid having the structure

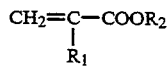

wherein $R_1$ is a member selected from the group consisting of hydrogen, an alkyl group having from 1 to 4 carbon atoms and a halogen and $R_2$ is an alkyl group having from 1 to 2 carbon atoms in the presence of
   (C) from 16 to 20 parts by weight of a copolymer of a conjugated diene monomer selected from the group consisting of butadiene and isoprene and an olefinically unsaturated nitrile having the structure

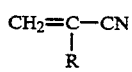

wherein R has the foregoing designation, said copolymer containing from 50 to 95% by weight of polymerized conjugated diene monomer and from 50 to 5% by weight of polymerized olefinically unsaturated nitrile.

2. The refrigerator liner of claim 1 wherein the (A) component is at least one of acrylonitrile or methacrylonitrile.

3. The refrigerator liner of claim 2 wherein the (A) component is acrylonitrile.

4. The refrigerator liner of claim 1 wherein the (B) component is at least one of ethyl acrylate or methyl acrylate.

5. The refrigerator liner of claim 4 wherein the (B) component is methyl acrylate.

6. The refrigerator liner of claim 1 where C is a copolymer of butadiene and acrylonitrile.

7. The refrigerator liner of claim 1 wherein the thermoplastic composition comprises approximately 18 parts by weight of the (C) component.

8. The refrigerator liner of claim 1 wherein there is 75% by weight of the (A) component and 25% by weight of the (B) component based on the combined weight of (A) and (B).

9. The refrigerator liner of claim 1, wherein the thermoplastic composition results from the polymerization of components (A), (B), (C) and at least one additional monomer selected from the group consisting of alpha-olefins having 4 to 10 carbon atoms, vinyl ethers, vinyl esters, acrylamide monomers, vinyl aromatic monomers, N-vinyl imides, maleic anhydride, indene and coumarone.

10. A refrigerator liner for use in refrigerators comprising the liner, an outer shell and insulation between the liner and outer shell, wherein the liner is exposed to blowing agents used in conjunction with the insulation, the liner consisting essentially of thermoplastic polymeric composition resulting from the polymerization in an aqueous medium of 100 parts by weight of
   (A) at least 50% by weight based on the combined weight of (A) and (B) of an alpha, beta-olefinically unsaturated mononitrile having the structure

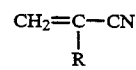

wherein R is a member selected from the group consisting of hydrogen, a lower alkyl group having from 1 to 4 carbon atoms and a halogen and
   (B) up to 50% by weight based on the combined weight of (A) and (B) of an ester of an olefinically unsaturated carboxylic acid having the structure

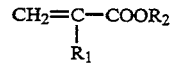

wherein $R_1$ is a member selected from the group consisting of hydrogen, an alkyl group having from 1 to 4 carbon atoms and a halogen and $R_2$ is an alkyl group having from 1 to 2 carbon atoms in the presence of
   (C) from 14 to 30 parts by weight of a copolymer of a conjugated diene monomer selected from the group consisting of butadiene and isoprene and an olefinically unsaturated nitrile having the structure

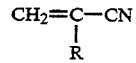

wherein R has the foregoing designation, said copolymer containing from 50 to 95% by weight of polymerized conjugated diene monomer and from 50 to 5% by weight of polymerized olefinically unsaturated nitrile.

* * * * *